US010685645B2

(12) United States Patent
Shanmugam et al.

(10) Patent No.: US 10,685,645 B2
(45) Date of Patent: Jun. 16, 2020

(54) IDENTIFICATION OF CANDIDATE TRAINING UTTERANCES FROM HUMAN CONVERSATIONS WITH AN INTELLIGENT INTERACTIVE ASSISTANT

(71) Applicant: Bank of America Corporation, Charlotte, NC (US)

(72) Inventors: Maruthi Z. Shanmugam, Plano, TX (US); Luis Gerardo Mojica de la Vega, Plano, TX (US); Donatus Asumu, Plano, TX (US)

(73) Assignee: Bank of America Corporation, Charlotte, NC (US)

( * ) Notice: Subject to any disclaimer, the term of this patent is extended or adjusted under 35 U.S.C. 154(b) by 187 days.

(21) Appl. No.: 16/059,189

(22) Filed: Aug. 9, 2018

(65) Prior Publication Data

US 2020/0051547 A1 Feb. 13, 2020

(51) Int. Cl.
*G10L 15/22* (2006.01)
*G10L 15/06* (2013.01)
*G10L 15/18* (2013.01)

(52) U.S. Cl.
CPC ........ *G10L 15/063* (2013.01); *G10L 15/1815* (2013.01); *G10L 15/22* (2013.01); *G10L 2015/0633* (2013.01); *G10L 2015/223* (2013.01)

(58) Field of Classification Search
CPC . G10L 15/1822; G10L 15/1815; G10L 15/07; G10L 15/26; G10L 15/00; G10L 15/063; G10L 15/10; G10L 15/18; G10L 15/197; G10L 15/22; G10L 15/28; G10L 15/20; G10L 15/06; G10L 15/16; G10L 15/183; G10L 15/19; G10L 21/10; G10L 25/48; G06F 40/30; G06F 40/137; G06F 40/211; G06F 40/216; G06F 40/237; G06F 40/279; G06N 3/08; G06N 99/00
(Continued)

(56) References Cited

U.S. PATENT DOCUMENTS 8,185,339 B2 * 5/2012 Maeda ............. G01R 31/31907 702/117
8,265,939 B2 * 9/2012 Kanevsky ........... G10L 15/1815 704/275

(Continued)

*Primary Examiner* — Vijay B Chawan
(74) *Attorney, Agent, or Firm* — Weiss & Arons LLP; Michael A. Springs, Esq.

(57) ABSTRACT

A method for creating binary classification models and using the binary classification models to select candidate training utterances from a plurality of live utterances is provided. The method may include receiving a plurality of intents and associated training utterances. The method may include creating, from the training utterances, a binary classification model for each intent. The binary classification model may include a vector representation of a line of demarcation between utterances associated with the intent and utterances disassociated from the intent. The method may also include receiving live utterances. An intent may be determined for each live utterance. The method may include creating a vector representation of the live utterance. The method may include selecting candidate training utterances based on a comparison between the vector representation of the live utterance and the vector representation included in the binary classification model of the intent determined for the live utterance.

14 Claims, 2 Drawing Sheets

(58) Field of Classification Search
USPC ........... 704/257, 9, 275, 235, 243, 251, 270, 704/270.1, 230, 231, 239, 240, 244, 245, 704/252, 255; 706/11, 45, 50, 53; 707/731, 736, 738, 739, 750
See application file for complete search history.

(56) References Cited

U.S. PATENT DOCUMENTS

| | | | | | |
|---|---|---|---|---|---|
| 8,321,220 | B1 * | 11/2012 | Chotimongkol | G09B 19/04 | 704/10 |
| 8,515,736 | B1 * | 8/2013 | Duta | G06F 40/30 | 704/9 |
| 8,554,559 | B1 * | 10/2013 | Aleksic | G10L 15/30 | 704/235 |
| 8,688,453 | B1 * | 4/2014 | Joshi | G10L 15/1822 | 704/257 |
| 8,700,404 | B1 * | 4/2014 | Chotimongkol | G10L 15/1815 | 704/257 |
| 8,880,398 | B1 * | 11/2014 | Aleksic | G10L 15/30 | 704/235 |
| 8,983,840 | B2 * | 3/2015 | Deshmukh | G10L 15/18 | 704/257 |
| 10,216,832 | B2 * | 2/2019 | Bangalore | G06F 16/3329 | |
| 2015/0310862 | A1 * | 10/2015 | Dauphin | G10L 15/1815 | 704/257 |
| 2019/0310824 | A1 * | 10/2019 | Sung | G10L 15/22 | |
| 2019/0362710 | A1 * | 11/2019 | Yannam | G06Q 30/01 | |

* cited by examiner

IDENTIFICATION OF CANDIDATE TRAINING UTTERANCES FROM HUMAN CONVERSATIONS WITH AN INTELLIGENT INTERACTIVE ASSISTANT

FIELD OF TECHNOLOGY

This disclosure relates to identifying and selecting candidate training utterances from human conversations. More specifically, this disclosure includes using an intelligent interactive assistant to identify and select the candidate training utterances.

BACKGROUND OF THE DISCLOSURE

Voice response units receive utterances from human callers. These utterances typically correspond to the reason/intent for the human caller's call. These voice response units combined with artificial intelligence systems use a variety of techniques to correctly discern the meaning of the utterance, or the intent of the human caller's utterance.

Conventionally, artificial intelligence systems are powered by one or more group of training datasets. Certain artificial intelligence systems categorize, infer and process live incoming utterances based on the information learned from the one or more training datasets.

The training datasets must be updated continuously in order to keep the artificial intelligence systems up to date. In conventional systems, subject matter experts update the training datasets. Typically, the subject matter experts analyze, populate and curate a set of utterances which are then included in the training datasets.

It would be desirable to review the live utterances received and identify interesting utterances—candidate training utterances, from the live utterances, that can be included in the training dataset. Artificial intelligence systems can monitor live incoming utterances at a rate that generally exceeds the ability of a human subject matter expert to supervise ongoing learning of an artificial intelligence system. Therefore, it would be further desirable to train the artificial intelligence system to identify live utterances that can be used for candidate training utterances.

SUMMARY OF THE DISCLOSURE

Aspects of the disclosure relate to identifying interesting live utterances in order to train an artificial intelligence system.

The method may include receiving a plurality of intents. The method may include receiving pluralities of training utterances. Each plurality of training utterances may be associated with an intent.

The method may include combining the pluralities of training utterances into a training utterance collection. The method may include generating all of the n-grams included in the training utterance collection. N-grams may be generated by dividing an utterance into individual tokens or unigrams (words), bigrams (linear sequence of two words), trigrams (linear sequence of three words) and n-grams (linear sequence of a variable (n) number of words). An example of an utterance divided into n-grams is shown below in table A.

TABLE A

| Utterance | Unigrams (1-grams) | Bigrams (2-grams) | Trigrams (3-grams) | 4-grams |
|---|---|---|---|---|
| I want to change my card photo | I | I want | I want to | I want to change |
| | want | want to | want to change | want to change my |
| | to | to change | to change my | to change my card |
| | change | change my | change my card | change my card photo |
| | my | my card | my card photo | |
| | card | card photo | | |
| | photo | | | |

Each utterance may be associated with an intent. Multiple utterances may be associated with one intent. Examples of utterances and their respective intents are shown in table B.

TABLE B

| Intents | Utterances |
|---|---|
| Service Intent GET BALANCE | 'Do I have money' |
| | 'checking account balance' |
| | 'View my account balance' |
| Service Intent SEARCH TRANSACTION | 'Did I shop at W-mart' |
| | 'show me my transaction on groceries' |
| Frequently Asked Question CAR LOAN ELIGIBILITY | 'Who is eligible to apply for an auto loan?' |
| | 'Am I able to get a car loan?' |
| Service Intent SPEND BUDGET GENERAL | 'show my spending at W-mart' |
| | 'show my spending on groceries' |
| Service Intent CONTACT US | 'I want to talk to a manager' |
| | 'talk to a manager' |
| | 'Call Bank of ABCDE about bills' |

The method may include assigning each n-gram a unique numeric identifier. Examples of unique identifiers assigned to n-grams are shown below in table C.

TABLE C

| N-gram | Unique identifier |
|---|---|
| who | 119 |
| is | 23 |
| eligible | 135 |
| to | 74 |
| apply | 145 |
| for | 125 |
| an | 25 |
| auto | 78 |
| loan | 120 |
| who is | 28 |
| is eligible | 50 |
| eligible to | 129 |
| to apply | 85 |
| apply for | 20 |
| for an | 114 |
| an auto | 14 |
| auto loan | 47 |
| who is eligible | 139 |
| is eligible to | 140 |
| eligible to apply | 39 |
| to apply for | 112 |
| apply for an | 17 |
| for an auto | 9 |
| an auto loan | 121 |
| who is eligible to | 15 |
| is eligible to apply | 83 |
| eligible to apply for | 70 |
| to apply for an | 109 |
| apply for an auto | 144 |
| for an auto loan | 32 |

TABLE C-continued

| N-gram | Unique identifier |
|---|---|
| am | 24 |
| i | 63 |
| able | 72 |
| get | 51 |
| a | 57 |
| car | 134 |
| am i | 52 |
| i able | 105 |
| able to | 91 |
| to get | 26 |
| get a | 128 |
| a car | 150 |
| car loan | 68 |
| am i able | 93 |
| i able to | 79 |
| able to get | 136 |
| to get a | 56 |
| get a car | 156 |
| a car loan | 104 |
| am i able to | 154 |
| i able to get | 131 |
| able to get a | 122 |
| to get a car | 64 |
| get a car loan | 92 |
| did | 75 |
| shop | 123 |
| at | 31 |
| w-mart | 2 |
| did i | 115 |
| i shop | 62 |
| shop at | 102 |
| at w-mart | 61 |
| did i shop | 103 |
| i shop at | 87 |
| shop at w-mart | 40 |
| did i shop at | 77 |
| i shop at w-mart | 16 |
| show | 126 |
| me | 94 |
| my | 106 |
| transaction | 76 |
| on | 142 |
| groceries | 38 |
| show me | 107 |
| me my | 13 |
| my transaction | 53 |
| transaction on | 55 |
| on groceries | 116 |
| show me my | 65 |
| me my transaction | 88 |
| my transaction on | 117 |
| transaction on groceries | 19 |
| show me my transaction | 141 |
| me my transaction on | 81 |
| my transaction on groceries | 147 |
| do | 86 |
| have | 54 |
| money | 151 |
| do i | 35 |
| i have | 99 |
| have money | 36 |
| do i have | 110 |
| i have money | 113 |
| do i have money | 69 |
| checking | 42 |
| account | 155 |
| balance | 10 |
| checking account | 29 |
| account balance | 71 |
| checking account balance | 108 |
| view | 89 |
| view my | 11 |
| my account | 27 |
| view my account | 97 |
| my account balance | 33 |
| view my account balance | 1 |
| want | 21 |
| talk | 98 |

TABLE C-continued

| N-gram | Unique identifier |
|---|---|
| manager | 60 |
| i want | 41 |
| want to | 45 |
| to talk | 80 |
| talk to | 90 |
| to a | 127 |
| a manager | 30 |
| i want to | 132 |
| want to talk | 84 |
| to talk to | 143 |
| talk to a | 152 |
| to a manager | 34 |
| i want to talk | 73 |
| want to talk to | 100 |
| to talk to a | 48 |
| talk to a manager | 146 |
| call | 67 |
| bank | 7 |
| of | 137 |
| abcde | 5 |
| about | 3 |
| bills | 138 |
| call bank | 95 |
| bank of | 133 |
| of abcde | 82 |
| abcde about | 43 |
| about bills | 22 |
| call bank of | 37 |
| bank of abcde | 46 |
| of abcde about | 66 |
| abcde about bills | 124 |
| call bank of abcde | 58 |
| bank of abcde about | 118 |
| of abcde about bills | 49 |
| spending | 111 |
| show my | 96 |
| my spending | 101 |
| spending at | 153 |
| show my spending | 12 |
| my spending at | 8 |
| spending at w-mart | 59 |
| show my spending at | 18 |
| my spending at w-mart | 6 |
| spending on | 44 |
| my spending on | 130 |
| spending on groceries | 4 |
| show my spending on | 148 |
| my spending on groceries | 149 |

Table D shows Table C sorted by the unique identifiers in ascending order.

TABLE D

| N-gram | Unique identifier (N-grams sorted by unique identifier in ascending order) |
|---|---|
| view my account balance | 1 |
| w-mart | 2 |
| about | 3 |
| spending on groceries | 4 |
| abcde | 5 |
| my spending at w-mart | 6 |
| bank | 7 |
| my spending at | 8 |
| for an auto | 9 |
| balance | 10 |
| view my | 11 |
| show my spending | 12 |
| me my | 13 |
| an auto | 14 |
| who is eligible to | 15 |
| i shop at w-mart | 16 |
| apply for an | 17 |
| show my spending at | 18 |
| transaction on groceries | 19 |

TABLE D-continued

| N-gram | Unique identifier (N-grams sorted by unique identifier in ascending order) |
|---|---|
| apply for | 20 |
| want | 21 |
| about bills | 22 |
| is | 23 |
| am | 24 |
| an | 25 |
| to get | 26 |
| my account | 27 |
| who is | 28 |
| checking account | 29 |
| a manager | 30 |
| at | 31 |
| for an auto loan | 32 |
| my account balance | 33 |
| to a manager | 34 |
| do i | 35 |
| have money | 36 |
| call bank of | 37 |
| groceries | 38 |
| eligible to apply | 39 |
| shop at w-mart | 40 |
| i want | 41 |
| checking | 42 |
| abcde about | 43 |
| spending on | 44 |
| want to | 45 |
| bank of abcde | 46 |
| auto loan | 47 |
| to talk to a | 48 |
| of abcde about bills | 49 |
| is eligible | 50 |
| get | 51 |
| am i | 52 |
| my transaction | 53 |
| have | 54 |
| transaction on | 55 |
| to get a | 56 |
| a | 57 |
| call bank of abcde | 58 |
| spending at w-mart | 59 |
| manager | 60 |
| at w-mart | 61 |
| i shop | 62 |
| i | 63 |
| to get a car | 64 |
| show me my | 65 |
| of abcde about | 66 |
| call | 67 |
| car loan | 68 |
| do i have money | 69 |
| eligible to apply for | 70 |
| account balance | 71 |
| able | 72 |
| i want to talk | 73 |
| to | 74 |
| did | 75 |
| transaction | 76 |
| did i shop at | 77 |
| auto | 78 |
| i able to | 79 |
| to talk | 80 |
| me my transaction on | 81 |
| of abcde | 82 |
| is eligible to apply | 83 |
| want to talk | 84 |
| to apply | 85 |
| do | 86 |
| i shop at | 87 |
| me my transaction | 88 |
| view | 89 |
| talk to | 90 |
| able to | 91 |
| get a car loan | 92 |
| am i able | 93 |
| me | 94 |
| call bank | 95 |
| show my | 96 |

TABLE D-continued

| N-gram | Unique identifier (N-grams sorted by unique identifier in ascending order) |
|---|---|
| view my account | 97 |
| talk | 98 |
| i have | 99 |
| want to talk to | 100 |
| my spending | 101 |
| shop at | 102 |
| did i shop | 103 |
| a car loan | 104 |
| i able | 105 |
| my | 106 |
| show me | 107 |
| checking account balance | 108 |
| to apply for an | 109 |
| do i have | 110 |
| spending | 111 |
| to apply for | 112 |
| i have money | 113 |
| for an | 114 |
| did i | 115 |
| on groceries | 116 |
| my transaction on | 117 |
| bank of abcde about | 118 |
| who | 119 |
| loan | 120 |
| an auto loan | 121 |
| able to get a | 122 |
| shop | 123 |
| abcde about bills | 124 |
| for | 125 |
| show | 126 |
| to a | 127 |
| get a | 128 |
| eligible to | 129 |
| my spending on | 130 |
| i able to get | 131 |
| i want to | 132 |
| bank of | 133 |
| car | 134 |
| eligible | 135 |
| able to get | 136 |
| of | 137 |
| bills | 138 |
| who is eligible | 139 |
| is eligible to | 140 |
| show me my transaction | 141 |
| on | 142 |
| to talk to | 143 |
| apply for an auto | 144 |
| apply | 145 |
| talk to a manager | 146 |
| my transaction on groceries | 147 |
| show my spending on | 148 |
| my spending on groceries | 149 |
| a car | 150 |
| money | 151 |
| talk to a | 152 |
| spending at | 153 |
| am i able to | 154 |
| account | 155 |
| get a car | 156 |

The method may include a process for creating a binary classification model for each intent included in the plurality of intents. The following process refers to a first intent included in the plurality of intents, but it should be appreciated that the process may be executed for each intent included in the plurality of intents.

The method may include assigning an entry for each of the training utterances included in the training utterance collection. It should be appreciated that all training utterances are assigned an entry for each intent. Therefore, some of the training utterances that are assigned an entry for the first intent may be associated with the first intent; other training utterances that are assigned an entry for the first intent may not be associated with the first intent.

Each entry may include the unique identifiers of each n-gram included in the training utterances. Each unique identifier, included in each entry, may be accompanied by the number of times the n-gram appears in the training utterance. Each entry may include a notation. The notation may be a "zero" notation or a "one" notation. The notation may indicate whether the entry is associated with the first intent or whether the entry is not associated with the first intent. A "one" notation may indicate that the entry is associated with the first intent. A "zero" notation may indicate that the entry is not associated with, or disassociated from, the first intent. Examples of entries for exemplary intent—service intent get balance, have been included in table E.

TABLE E

List of entries for service intent get balance

| "Zero" or "one" notation | Unique Identifier of n-gram:Number of times n-gram appears in utterance |
|---|---|
| 0 | 2:1 16:1 31:1 40:1 61:1 62:1 63:1 75:1 77:1 87:1 102:1 103:1 115:1 123:1 |
| 0 | 13:1 19:1 38:1 53:1 55:1 65:1 76:1 81:1 88:1 94:1 106:1 107:1 116:1 117:1 126:1 141:1 142:1 147:1 |
| 0 | 2:1 16:1 31:1 40:1 61:1 62:1 63:1 75:1 77:1 87:1 102:1 103:1 115:1 123:1 |
| 0 | 13:1 19:1 38:1 53:1 55:1 65:1 76:1 81:1 88:1 94:1 106:1 107:1 116:1 117:1 126:1 141:1 142:1 147:1 |
| 0 | 21:1 30:1 34:1 41:1 45:1 48:1 57:1 60:1 63:1 73:1 74:1 80:1 84:1 90:1 98:1 100:1 127:1 132:1 143:1 146:1 152:1 |
| 0 | 3:1 5:1 7:1 22:1 37:1 43:1 46:1 49:1 58:1 66:1 67:1 82:1 95:1 118:1 124:1 133:1 137:1 138:1 |
| 0 | 21:1 30:1 34:1 41:1 45:1 48:1 57:1 60:1 63:1 73:1 74:1 80:1 84:1 90:1 98:1 100:1 127:1 132:1 143:1 146:1 152:1 |
| 0 | 3:1 5:1 7:1 22:1 37:1 43:1 46:1 49:1 58:1 66:1 67:1 82:1 95:1 118:1 124:1 133:1 137:1 138:1 |
| 1 | 35:1 36:1 54:1 63:1 69:1 86:1 99:1 110:1 113:1 151:1 |
| 1 | 10:1 29:1 42:1 71:1 108:1 155:1 |
| 1 | 1:1 10:1 11:1 27:1 33:1 71:1 89:1 97:1 106:1 155:1 |
| 1 | 35:1 36:1 54:1 63:1 69:1 86:1 99:1 110:1 113:1 151:1 |
| 1 | 10:1 29:1 42:1 71:1 108:1 155:1 |
| 1 | 1:1 10:1 11:1 27:1 33:1 71:1 89:1 97:1 106:1 155:1 |
| 1 | 35:1 36:1 54:1 63:1 69:1 86:1 99:1 110:1 113:1 151:1 |
| 1 | 10:1 29:1 42:1 71:1 108:1 155:1 |
| 1 | 1:1 10:1 11:1 27:1 33:1 71:1 89:1 97:1 106:1 155:1 |
| 0 | 2:1 6:1 8:1 12:1 18:1 31:1 59:1 61:1 96:1 101:1 106:1 111:1 126:1 153:1 |
| 0 | 4:1 12:1 38:1 44:1 96:1 101:1 106:1 111:1 116:1 126:1 130:1 142:1 148:1 149:1 |
| 0 | 2:1 6:1 8:1 12:1 18:1 31:1 59:1 61:1 96:1 101:1 106:1 111:1 126:1 153:1 |
| 0 | 4:1 12:1 38:1 44:1 96:1 101:1 106:1 111:1 116:1 126:1 130:1 142:1 148:1 149:1 |
| 0 | 9:1 14:1 15:1 17:1 20:1 23:1 25:1 28:1 32:1 39:1 47:1 50:1 70:1 74:1 78:1 83:1 85:1 109:1 112:1 114:1 119:1 120:1 121:1 125:1 129:1 135:1 139:1 140:1 144:1 145:1 |
| 0 | 24:1 26:1 51:1 52:1 56:1 57:1 63:1 64:1 68:1 72:1 74:1 79:1 91:1 92:1 93:1 104:1 105:1 120:1 122:1 128:1 131:1 134:1 136:1 150:1 154:1 156:1 |
| 0 | 9:1 14:1 15:1 17:1 20:1 23:1 25:1 28:1 32:1 39:1 47:1 50:1 70:1 74:1 78:1 83:1 85:1 109:1 112:1 114:1 119:1 120:1 121:1 125:1 129:1 135:1 139:1 140:1 144:1 145:1 |
| 0 | 24:1 26:1 51:1 52:1 56:1 57:1 63:1 64:1 68:1 72:1 74:1 79:1 91:1 92:1 93:1 104:1 105:1 120:1 122:1 128:1 131:1 134:1 136:1 150:1 154:1 156:1 |

Each entry may be converted into a vector representation. A support vector machine ("SVM") may execute the conversion. In some embodiments, the notation may be stored with the entry after the entry has been converted to a vector representation.

The vector representations, which correspond to the utterances, may be divided into two groups. A first group may be identified by vector representations that have been assigned a "one" notation (the vector representations associated with the first intent). A second group may be identified by vector representations that have been assigned a "zero" notation (the vector representations not associated with the first intent).

The method may include determining (defining) a line of demarcation between the first group and the second group. The SVM may determine a vector representation of the line of demarcation.

The method may include creating a binary classification model for the first intent. The binary classification model may include the first group of vector representations, the second group of vector representations and the vector representation of the line of demarcation.

The above-mentioned steps may be included in a low-frequency training process subsystem. The low-frequency training process subsystem may be used to initially and periodically train the artificial intelligence system.

The following steps may be included in a high-frequency process subsystem. The high-frequency process subsystem may be implemented at a higher frequency than the low-frequency subsystem. In some embodiments, the high-frequency subsystem may be implemented daily or hourly.

The method may include receiving a historical live utterance. The receiving may be performed in real-time—i.e., as the utterance is being spoken. The receiving may be performed in a batch mode—i.e., after a predetermined time period the most recent utterances are transmitted to a receiver.

The method may include receiving a historical intent determined for the historical live utterance. The historical intent may match an intent included in the plurality of intents. The method may include converting the historical live utterance into a historical live utterance entry. The conversion may include generating all n-grams for the historical live utterance. The conversion may also include retrieving the unique numeric identifiers associated with each of the n-grams retrieved for the historical live utterance. The conversion may include accompanying each retrieved unique identifier by a number of times the n-gram appears in the historical live utterance.

The method may include converting the historical live utterance entry into a historical live utterance vector representation. The method may include determining a difference score between the historical live utterance vector representation and the vector representation of the line of demarcation included in the binary classification model associated with the historical intent. When the difference score is greater than or less than a predetermined threshold, the method may include retrieving the historical live utterance as utterance of interest, or a candidate training utterance.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
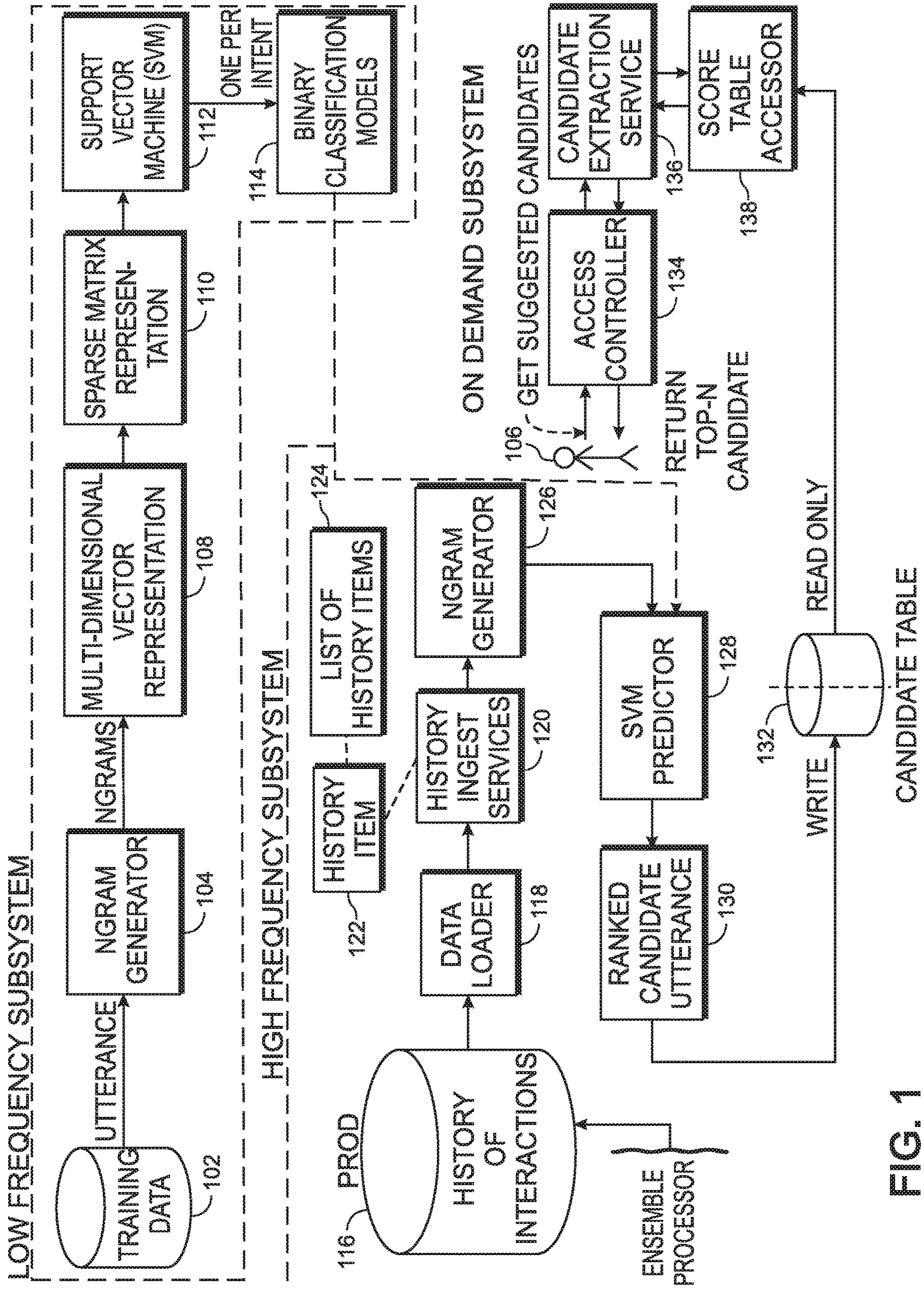
FIG. 1 shows an illustrative flow chart in accordance with principles of the disclosure.

An apparatus for creating a binary classification model is provided. The apparatus may include a receiver. The receiver may be operable to receive a plurality of intents. The receiver may also be operable to receive pluralities of training utterances. Each plurality of training utterances may be associated with an intent included in the plurality of intents.

The apparatus may include a processor. The processor may be operable to combine all of the received training utterances into a training utterance collection. The processor may also be operable to generate all n-grams included in all of the training utterances. The processor may also be operable to assign each generated n-gram a unique numeric identifier.

The processor may also be operable to perform a process for a first intent. The process may be repeated for multiple intents included in the plurality of intents. The process may assign an entry for each of the training utterances included in the training utterance collection. Each entry may include the unique identifiers of the n-gram. Each unique identifier within each entry may be accompanied by a number of times the n-gram appears in the training utterance. Each entry may be assigned either a “one” notation or a “zero” notation. The “one” notation may indicate that the training utterance is associated with the first intent. The “zero” notation may indicate that the training utterance is disassociated from the first intent.

The apparatus may include a support vector machine (“SVM”). The SVM may be operable to convert each entry into a vector representation. The SVM may be operable to separate the vector representation into two groups. A first group may be identified by the vector representations that are assigned the “one” notation. A second group may be identified by the vector representations that are assigned the “zero” notation. The SVM may determine a line of demarcation between the vector representations of the first group and the vector representations of the second group. The SVM may determine a vector representation of the line of demarcation.

The SVM may also create a binary classification model. The binary classification model may include the first group of vector representations. The binary classification model may also include the second group of vector representations. The binary classification model may also include the vector representation of the line of demarcation.

The above-mentioned steps performed by the receiver, the processor and/or the SVM may be included in a low-frequency training process subsystem. The low-frequency training process subsystem may be used to initially and periodically train the artificial intelligence system.

The following steps performed by the receiver, processor and/or SVM may be included in a high-frequency process subsystem. The high-frequency process subsystem may be implemented at a higher frequency than the low-frequency subsystem. In some embodiments, the high-frequency subsystem may be implemented daily or hourly.

The receiver may be operable to receive a historical live utterance. The receiver may also be operable to receive a historical intent determined for the historical live utterance. The processor may determine that the historical intent matches an intent included in the plurality of intents.

The processor may convert the historical live utterance into a historical live utterance entry. The conversion may include generating all n-grams for the historical live utterances. The conversion may include retrieving the unique numeric identifiers associated with each of the n-grams generated for the first historical live utterance. The conversion may also include linking each retrieved unique identifier to a number of times the n-gram appears in the historical live utterance.

The SVM may be operable to convert the historical live utterance entry into a historical live utterance vector representation. The SVM may also be operable to determine a difference score between the historical live utterance vector representation and the vector representation of the line of demarcation. When the difference score is greater than or less than a predetermined threshold, the SVM may retrieve the historical live utterance as a candidate training utterance. In some embodiments, the predetermined threshold may be 1, 2, 2.2, 2.5, 3, 3.2, 3.5, 4, 5, 20 or any other suitable number.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is understood that other embodiments may be utilized, and that structural, functional, and procedural modifications may be made without departing from the scope and spirit of the present disclosure.

FIG. 1 shows an illustrative flow chart. The illustrative flow chart includes a low frequency subsystem, a high frequency subsystem and an on-demand subsystem.

The low frequency subsystem may be executed weekly, monthly or on any other suitable interval. The low frequency subsystem may train an artificial intelligence system. Training database 102 may receive a plurality of utterances. Each utterance may processed through n-gram generator 104. N-gram generator 104 may generate a plurality of n-grams for each utterance.

The n-grams associated with each utterance may be used to generate a multi-dimensional vector representation that corresponds to the utterance, as shown at 108. A sparse matrix representation, including all of the vector representations associated with a single intent, may be generated, as shown at 110.

A support vector machine (“SVM”) may be receive the sparse matrix representation, as shown at 112. The SVM may process the sparse matrix representation. The SVM may generate binary classification models for each intent included in the sparse matrix representation. The binary classification models, shown at 114, may include a vector representation of a line of demarcation between vectors of utterances associated with a selected intent and vectors of utterances disassociated from the selected intent.

The high frequency subsystem may be executed daily, hourly or at any other suitable interval. The high frequency subsystem may be initiated by an ensemble processor. The high frequency subsystem may be executed in a production environment. Historical utterances (that may have occurred in the past week, hour, day) may be stored in a history of interactions database or in a list of historical items, shown at 124. Utterances stored in the history of interactions database may be passed to data loader 118, which may load the utterances into history ingest service 120. List of historical items 124 may be passed to history item service 122, which may be passed to history ingest service 120. N-gram generator 126, which may be the same generator or a different generator from n-gram generator 104, may generate n-grams for each historical utterance received.

SVM predictor 128 may receive both the binary classification models shown at 114 and the n-grams generated by n-gram generator 126. SVM predictor 128 may generate an utterance based on its n-grams. SVM predictor 128 may compare the generated vector to the binary classification model associated with the utterance's intent. The difference between the n-gram and the binary classification model may be calculated. The utterances may be ranked according to the score received, as shown at 130. The higher scores may rank an utterance higher, while the lower scores may rank an utterance lower. The candidate training utterances may be written to candidate table 132.

The on-demand subsystem may be executed by user 106. The on-demand subsystem may be executed by user 106 whenever a user requests. User 106 may access a controller, as shown at 134. The controller may communicate with candidate extraction service 136. Candidate extraction service 136 may communicate with score table accessor 138. Score table accessor 138 may retrieve, using read-only access, a predetermined number of the highest scoring candidate training utterances. Score table accessor 138 may communicate the utterances back to candidate extraction service 136, which may communicate the top candidates to access controller 134, which may return the top candidates to user 106.

Figure 2:
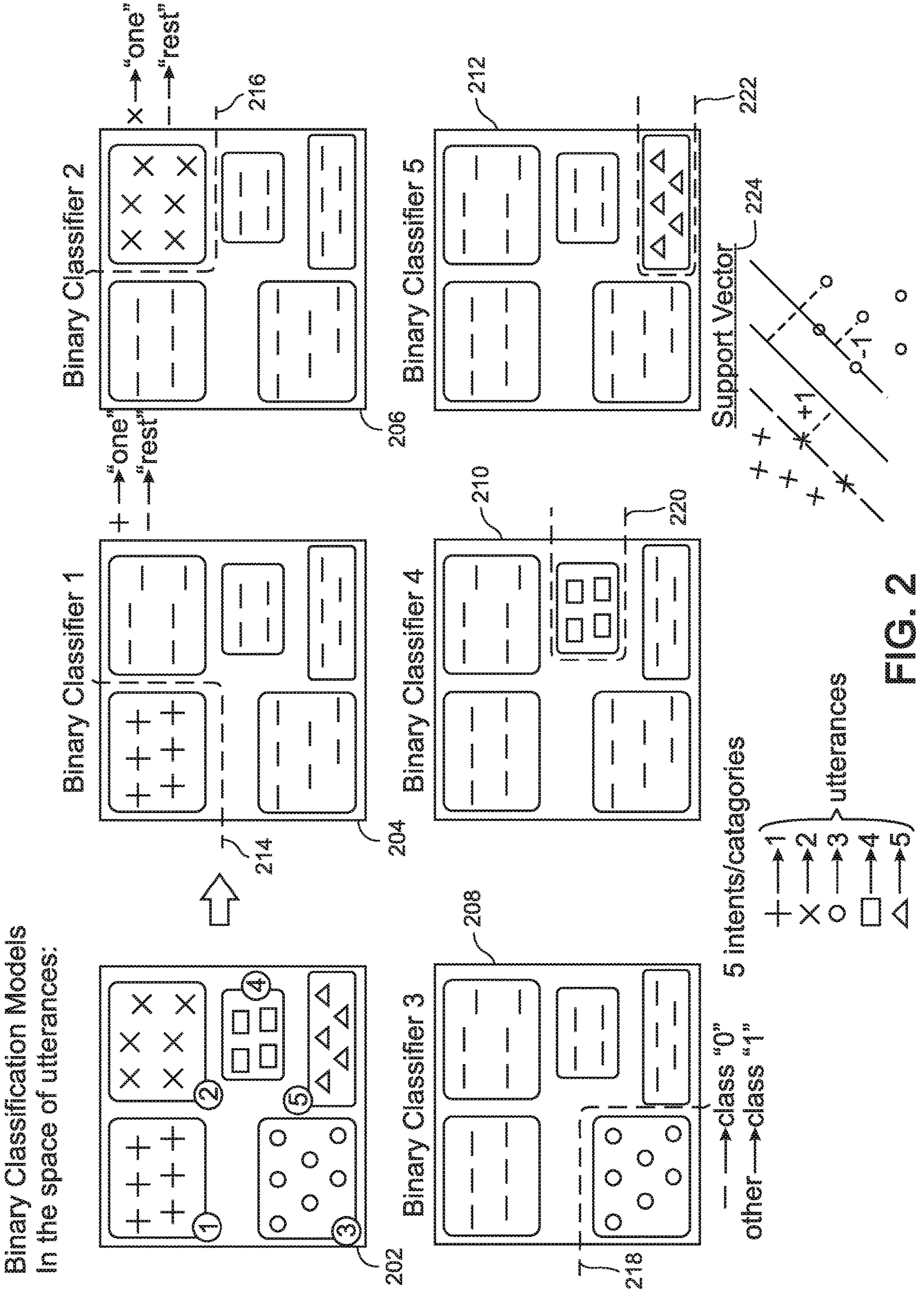
FIG. 2 shows an illustrative diagram in accordance with principles of the disclosure.

FIG. 2 shows a diagram of binary classification models. Diagram 202 shows five intents: an intent indicated by a plus sign, an intent indicated by an x, an intent indicated by a circle, an intent indicated by a square and an intent indicated by a triangle. Each binary classification model, shown at 204, 206, 208, 210 and 212 may show the utterances associated with the intent and the rest of the utterances disassociated from the intent. Lines of demarcation shown at 214, 216, 218, 220 and 222 may be generated to differentiate the utterances associated with the intent and the utterances disassociated from the intent. As shown at 224, an utterance with a determined intent may be plotted close to, or far from, the vector representation of the line of demarcation. Utterances that plot far from the vector representation of the line of demarcation may be identified as candidate training utterances.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods and apparatus for identification of candidate training utterances from human conversations with an intelligent interactive assistant are provided. Persons skilled in the art will appreciate that the present invention can be practiced by other than the described embodiments, which are presented for purposes of illustration rather than of limitation, and that the present invention is limited only by the claims that follow.

What is claimed is:

1. A method for creating a binary classification model, the method comprising:

receiving a plurality of intents;

for each intent, receiving a plurality of associated training utterances;

combining all of the received training utterances into a training utterance collection;

generating all n-grams included in all of the training utterances;

assigning each n-gram a unique numeric identifier;

for a first intent, included in the plurality of intents:

assigning an entry for each of the training utterances included in the training utterance collection, wherein:

each entry comprises the unique identifiers of each n-gram included in the training utterances;

each unique identifier, included in each entry, is accompanied by a number of times the n-gram appears in the training utterance; and each entry is assigned either a "one" notation or a "zero" notation, the "one" notation indicating that the training utterance is associated with the first intent, the "zero" notation indicating that the training utterance is disassociated from the first intent;

converting, by a support vector machine ("SVM"), each entry into a vector representation;

separating, by the SVM, the vector representations into two groups, a first group and a second group, the first group being identified by the vector representations that are assigned the "one" notation, the second group being identified by the vector representations that are assigned to the "zero" notation;

defining, by the SVM, a vector representation of a line of demarcation between the vector representations of the first group and the vector representations of the second group;

creating a binary classification model for the first intent, said binary classification model comprising:

the first group of vector representations;

the second group of vector representations; and the vector representation of the line of demarcation.

2. The method of claim 1, further comprising:

receiving a historical live utterance;

receiving a historical intent determined for the historical live utterance;

determining that the historical intent matches the first intent;

converting the historical live utterance into a historical live utterance entry, said converting comprising:
generating all n-grams for the historical live utterance;
retrieving the unique numeric identifiers associated with each of the n-grams generated for the historical live utterance;
accompanying each retrieved unique identifier by a number of times the n-gram appears in the historical live utterance;
converting the historical live utterance entry into a historical live utterance vector representation;
determining a difference score between the historical live utterance vector representation and the vector representation of the line of demarcation;
when the difference score is greater than or less than a predetermined threshold, retrieving the historical live utterance as an utterance of interest.

3. The method of claim 1, further comprising ordering the unique identifiers, included in each entry, in ascending order.

4. The method of claim 1, wherein all n-grams are generated up to 4-grams.

5. The method of claim 1, wherein the method is executed one time per week.

6. The method of claim 1, wherein the method is executed one time per month.

7. The method of claim 2, wherein the predetermined threshold is 2.5.

8. An apparatus for creating a binary classification model, the apparatus comprising:
a receiver operable to receive:
a plurality of intents;
for each intent, a plurality of associated training utterances;
a processor operable to:
combine all of the received training utterances into a training utterance collection;
generate all n-grams included in all of the training utterances;
assign each generated n-gram a unique numeric identifier;
for a first intent, included in the plurality of intents:
assign an entry for each of the training utterances included in the training utterance collection, wherein each entry comprises the unique identifiers of each n-gram, wherein each unique identifier within each entry is accompanied by a number of times the n-gram appears in training utterance, wherein each entry is assigned either a "one" notation or a "zero" notation, the "one" notation indicating that the training utterance is associated with the first intent, the "zero" notation indicating that the training utterance is disassociated from the first intent;
a support vector machine ("SVM") operable to:
convert each entry into a vector representation;
separate the vector representations into two groups, a first group and a second group, the first group being identified by the vector representations that are assigned the "one" notation, the second group being identified by the vector representations that are assigned the "zero" notation;
determine a line of demarcation between the vector representations of the first group and the vector representations of the second group;
determine a vector representation of the line or demarcation;
create a binary classification model, said binary classification model comprising:
the first group of vector representations;
the second group of vector representations; and
the vector representation of the line of demarcation.

9. The apparatus of claim 8, wherein:
the receiver is further operable to receive:
a historical live utterance;
a historical intent determined for the historical live utterance;
the processor is further operable to:
determine that the historical intent matches the first intent;
convert the historical live utterance into a historical live utterance entry, the conversion comprising:
generate all n-grams for the historical live utterance;
retrieve the unique numeric identifiers associated with each of the n-grams generated for the historical live utterance;
link each retrieved unique identifier to a number of times the n-gram appears in the historical live utterance;
the SVM is further operable to:
convert the historical live utterance entry into a historical live utterance vector representation;
determine a difference score between the historical live utterance vector representation and the vector representation of the line of demarcation; and
when the difference score is greater than or less than a predetermined threshold, retrieving the historical live utterances as a candidate training utterance.

10. The apparatus of claim 8, wherein the processor is further operable to order the unique identifiers, included in each entry, in ascending order.

11. The method of claim 8, wherein the SVM determines a binary classification model one time per week.

12. The method of claim 8, wherein the SVM determines a binary classification model one time per month.

13. The method of claim 8, wherein all n-grams are generated up to 4-grams.

14. The apparatus of claim 9, wherein the predetermined threshold is 2.5.

* * * * *